(12) United States Patent
Ohtsu et al.

(10) Patent No.: US 6,707,612 B2
(45) Date of Patent: Mar. 16, 2004

(54) METHOD OF MANUFACTURING MICRO-LENS ARRAY, ELECTROLYTE AND MANUFACTURING APPARATUS USED THEREFOR

(75) Inventors: Shigemi Ohtsu, Nakai-machi (JP); Keishi Shimizu, Nakai-machi (JP); Kazutoshi Yatsuda, Nakai-machi (JP); Eiichi Akutsu, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/238,067

(22) Filed: Sep. 10, 2002

(65) Prior Publication Data

US 2003/0142409 A1 Jul. 31, 2003

(30) Foreign Application Priority Data

Jan. 28, 2002 (JP) ........................................ 2002-018746

(51) Int. Cl.[7] ............................. G02B 27/10; G03C 5/00
(52) U.S. Cl. ...................... 359/620; 359/619; 430/321
(58) Field of Search ................................. 359/619, 620; 430/7, 31, 321

(56) References Cited

U.S. PATENT DOCUMENTS 6,436,591 B1 * 8/2002 Ohtsu et al. ................... 430/7
6,500,589 B1 * 12/2002 Ohtsu et al. ................... 430/7
6,613,486 B1 * 9/2003 Shimizu et al. ............... 430/7
2002/0012856 A1 * 1/2002 Ohtsu et al. ................... 430/7
2002/0122649 A1 * 9/2002 Shimizu et al. ............. 385/129
2002/0132454 A1 * 9/2002 Ohtsu et al. ............... 438/486
2003/0142409 A1 * 7/2003 Ohtsu et al. ............... 428/701
2003/0143437 A1 * 7/2003 Ohtsu et al. ............... 359/619

FOREIGN PATENT DOCUMENTS

| JP | A 10-119414 | 5/1998 |
| JP | A 11-105418 | 4/1999 |
| JP | A 11-133224 | 5/1999 |
| JP | A 11-174790 | 7/1999 |
| JP | A 11-189899 | 7/1999 |
| JP | A 11-335894 | 12/1999 |
| JP | A 2001-140096 | 5/2001 |

* cited by examiner

Primary Examiner—David N. Spector
(74) Attorney, Agent, or Firm—Oliff & Berridge, PLC

(57) ABSTRACT

A method includes the steps of disposing a substrate having a conductive thin film and a photo-semiconductor thin film in this order on an insulative base in an aqueous electrolyte material that solubility is lowered by a change of pH, irradiating with light a selected region of the photo-semiconductor thin film and precipitating the material to the selected region of the photo-semiconductor thin film to form a micro-lens array layer.

21 Claims, 3 Drawing Sheets

METHOD OF MANUFACTURING MICRO-LENS ARRAY, ELECTROLYTE AND MANUFACTURING APPARATUS USED THEREFOR

BACKGROUND OF THE INVENTION

1. Field of the Invention

This invention relates to a method of manufacturing a micro-lens array callable of condensing light at a high efficiency, as well as an electrolyte used therefore and an apparatus for manufacturing the micro-lens array.

2. Description of the Related Art

A method of manufacturing a micro-lens array includes a photo-lithographic process, an etching process such as dry etching, a method of doping a high refractive index material by thermal diffusion or a method of casting a plastic material into a previously formed mold thereby forming a micro-lens array. In the photolithographic process, any micro-lens array at high resolution power can be formed but the control for the curvature of lens is difficult. The dry etching method requires a long etching time and involves difficulty for the curvature control of lens. The method of doping the high refractive index material by thermal diffusion has an advantage of a material being a flat plate but undergoes various restrictions for the shape and the curvature of the lens since control is conducted only in view of the refractive index, and undergoes restriction for materials in that heat resistance is required and the method can be used only for glass substrates. The method of providing a previously formed mold involves a problem in view of the restriction for the micro miniaturization of the mold. Further, all the techniques mentioned above require high cost, and a technique for forming a micro-lens, which is simple and convenient and has a high degree of freedom, has not yet been available at present.

Further, as a low-cost method, there is a method of burying micro beads in a binder resin but it involves a problem that a uniform arrangement of micro beads is difficult.

The present inventors have previously provided an image forming method of excellent resolution and a manufacturing method of a color filter by use of an electrodeposition material containing a colorant and electro-precipitating or photo-electronically precipitating the material under the application of a low voltage, which are disclosed specifically, for example, in Japanese Published Unexamined Patent Application Nos. Hei 10-119414, Hei 11-189899, Hei 11-105418, Hei 11-174790, Hei 11-133224, and Hei 11-335894. The image forming method and the color filter manufacturing method described above have a feature of forming a colored film at a high resolution in a simple manner, but they are techniques applied mainly in the field of display devices such as liquid crystal display devices.

Further, the present inventors have proposed a photo-catalytic film deposition method of forming a colored film for a color filter or the like at a good resolution by a simple method like that the methods described above (Japanese Published Unexamined Patent Application No. Hei 2001-140096)

On the other hand, the micro-lens array is used for display devices such as liquid crystal projectors, as well as optical devices for condensing lenses. As described above, the micro-lens array has been prepared by fine fabrication of photosensitive materials by way of complicate steps including photolithographic method and an attempt of preparing a micro-lens array by an electrodeposition method without complicate steps such as photo-lithography has not yet been practiced at present.

SUMMARY OF THE INVENTION

This invention provides a method of manufacturing a micro-lens array capable of manufacturing a micro-lens array by a simple and convenient method at a reduced cost and capable of optionally adjusting a degree of integration and a refractive index of a micro-lens, as well as an electrolyte and a manufacturing apparatus therefor.

This invention provides the followings.

A method of manufacturing a micro-lens array including the steps of: disposing a substrate having a conductive thin film and a photo-semiconductor thin film in this order on an insulative base in an aqueous electrolyte containing a film-forming material of which solubility or dispersibility to an aqueous liquid is lowered by a change of pH, with at least the photo-semiconductor thin film of the micro-lens array preparing substrate being in contact with the electrolyte, irradiating with light a selected region of the photo-semiconductor thin film to apply a voltage between the photo-semiconductor thin film in the selected region and a counter electrode and precipitating the material to the selected region of the semiconductor thin film to form a micro-lens array layer.

This invention also provides the following.

A method of manufacturing a micro-lens array including the steps of disposing a substrate in which a conductive thin film and a photo-semiconductor thin film in contact with the conductive thin film are formed on an insulative base and the conductive thin film is in electrical conduction with an electrolyte to an aqueous electrolyte containing a film-forming material of which solubility or dispersibility to an aqueous liquid is lowered by a change of pH, with the photo-semiconductor thin film being in contact with the electrolyte, irradiating with light a selected region of the photo-semiconductor thin film in a state where the photo-conductive thin film is in electrical conduction with the electrolyte and precipitating the material to the selected region of the photo-semiconductor thin film to form a micro-lens array layer.

DESCRIPTION OF THE ACCOMPANYING DRAWINGS

Preferred embodiments of this invention will be described in details based on the followings, wherein.

PREFERRED EMBODIMENTS OF THE INVENTION

Figure 1:
FIG. 1 is a conceptual view showing an example of a substrate for preparing a micro-lens array.

In accordance with this invention, a micro-lens array is formed by use of the photovoltaic electrodeposition method described in Japanese Published Unexamined Patent Application Hei 10-119414, Hei 11-189899, Hei 11-105418, Hei 11-174790, Hei 11-133224, and Hei 11-335894, or the photo-catalytic film deposition method as described in Japanese Published Unexamined Patent Application Hei 2001-140096.

The photovoltaic electrodeposition method utilizes a photo-voltaic force caused to an photo-semiconductor thin film, which includes the steps of disposing a conductive thin film and a photo-semiconductor thin film laminated in this order on an insulative substrate in an aqueous electrolyte containing a film-forming material of which solubility or dispersibility to an aqueous liquid is lowered by a change of pH in a state that at least the photo-semiconductor thin film is in contact with the electrolyte, irradiating with light a selected region of the photo-semiconductor thin film to apply a voltage between the photo-semiconductor thin film in the selected region and a counter electrode, and precipitating the material to the selected region of the semiconductor thin film. The photovoltaic electrodeposition method has a feature capable of forming a film of uniform thickness at a low voltage (5 V or lower), compared with the existent electrodeposition methods.

Further, the photo-catalytic film deposition method utilizes a photo-catalytic function of a photo-semiconductor thin film, which is described in details in columns 0025 to 0029 in Japanese Published Unexamined Patent Application No. Hei 2001-140096. In the method of manufacturing a micro-lens array utilizing this method, the same electrolyte as the one used in the photovoltaic electrodeposition method described above is used as an electrolyte, a conductive thin film and a photo-semiconductor thin film in contact with the conductive thin film are disposed on an insulative substrate as a substrate for manufacturing a micro-lens array, and the conductive thin film put in electrical conduction with electrolyte (refer to column 0026 of the publication described above) is used. Further, the substrate for preparing the micro-lens array is disposed in a state that the photo-semiconductor thin film is in contact with the electrolyte as well as the conductive thin film is put in electric conduction with the electrolyte (refer to column 0026 of the publication), and a selected region of the photo-semiconductor thin film is irradiated with light in this state and the material is precipitated to the selected region of the photo-semiconductor thin film thereby forming a micro-lens array layer.

Since the method of manufacturing the micro-lens array according to this method requires no electrodeposition apparatus and separate electrode for electrodeposition, a film can be formed at a reduced cost in a more simple and convenient apparatus. Further, high quality equal with that of the photovoltaic electrodeposition method can be attained in the thus manufactured micro-lens array.

The method of manufacturing a micro-lens array according to this invention can manufacture the micro-lens array by a simple and convenient method at a reduced cost by utilizing the photovoltaic electrodeposition method or the photo-catalytic film deposition method, as well as can manufacture a micro-lens array of a high integration degree (50,000 N/cm$^2$ or more in a micro-lens of 30 $\mu$m diameter), and can optionally adjust the integration degree and the refractive index. Further, it can manufacture micro-lens arrays of any pattern including complicated patterns. Furthermore, the light condensing efficiency of the resultant micro-lens array is high. In addition, since this is a simple and convenient method, mass production is possible. The existent method of manufacturing the micro-lens array using the photo-sensitive resin requires film coating on a substrate under accurate control for the thickness and involves a problem of discharging alkali liquid wastes by etching. According to this invention, lenses of a uniform shape can be manufactured easily and no etching treatment for pattern formation is necessary to cause a smaller burden on the environment.

A substrate for preparing a micro-lens array in the photovoltaic electrodeposition method includes a conductive thin film and a photo-semiconductor thin film laminated in this order on an insulative substrate. As the insulative substrate, glass plate, quartz plate, plastic film, epoxy substrate and the like are used. For the conductive thin film, ITO, indium oxide, nickel and aluminum and the like are used. As the photo-semiconductor thin film, titanium oxide thin film to be described later and the like are used. Further, when the photo-semiconductor thin film is irradiated with light through the insulative substrate, the insulative substrate and the conductive thin film have to be light permeable. However, this is not always necessary when the photo-semiconductor thin film is irradiated with light through the electrolyte.

Further, the insulative substrate, the conductive thin film and the photo-semiconductor thin film for the substrate for preparing the micro-lens array in the photo-catalytic film deposition method are identical with those of the preparing substrate in the photovoltaic electrodeposition method. It is, however, necessary in the preparing substrate that the photo-conductive thin film and the photo-semiconductor thin film are in contact with each other and the conductive thin film can be in electrical conduction with the electrolyte.

FIG. 1 shows an example of a substrate 1 for preparing a micro-lens array used in this invention. In the drawing, are shown an insulative substrate 10, a conductive thin film 12 and a photo-semiconductor thin film 14, respectively. The preparing substrate is used either in the photovoltaic electrodeposition method or the photo-catalytic film deposition method.

Then, the photo-semiconductor thin film (photo-catalytic thin film) in this invention is to be described. As the photo-semiconductor thin film used in the photovoltaic electrodeposition method and the photo-catalytic film deposition method, any of transparent thin film semiconductors can be used basically so long as it generates photo-voltaic force under light irradiation or it has a photo-catalytic function. Specifically, the semiconductor can include, for example, GaN, diamond, c-BN, SiC, ZnSe, $TiO_2$, ZnO, $In_2O_3$ and $SnO_2$. Among them, since titanium oxide has absorption only below 400 nm, is transparent and can be prepared easily into an n-type semiconductor, it can be used as it is for the substrate for preparing an optical device.

The method of disposing a titanium oxide semiconductor thin film on the substrate can include, for example, a thermal oxidation method, a sputtering method, an electron beam vapor deposition method (EB method), an ion plating method and a sol-gel method, and n-type semiconductor of good characteristic can be obtained by the method described above.

However, in a case of a substrate of low heat resistance such as a plastic film, a film deposition method giving no undesired effect on the plastic film has to be selected. The sol-gel method can form titanium oxide of high optical activity as a photo-semiconductor, but since it requires sintering at 500° C., it is difficult to prepare a titanium oxide film on a plastic film substrate having heat resistance only to about 200° C.

Accordingly, in a case of using the plastic film substrate, a sputtering method which is a film deposition method capable of preparing a film at a lower temperature, possibly, at 200° C. or lower and giving relatively smaller damages to the substrate, particularly, an RF sputtering method is used preferably. The RF sputtering method is a preferred method also from a viewpoint that an anatase type titanium oxide thin film of high optical activity can be obtained (an electron beam method and an ion plating method are not preferred since the substrate is heated to about 200° C.).

The electrolyte used for the photovoltaic electrodeposition method and the photo-catalytic film deposition method according to this invention at least contains a film-forming material of which solubility or the dispersibility to an aqueous liquid is lowered by a change of pH and which is precipitated from the electrolyte to deposit a film on the photo-semiconductor thin film. In a case where one or more kinds of film-forming materials has such a film precipitating property, even when various refractive index controlling materials having no film-forming property as a single material (to be described later) is dispersed in the electrolyte, it is incorporated into the film-forming material upon film formation and fixed in the micro-lens array.

The film-forming material of which solubility or dispersibility to an aqueous liquid is lowered by a change of pH preferably contains a material having groups that change the ionic dissociation property thereof depending on a change of the liquid pH (ionic groups) such as carboxyl groups or amino groups in the molecule. However, the presence of the ionic groups in the material is not always essential and there is no restriction on the polarity of ions.

The film-forming material the solubility or dispersible of which to the aqueous liquid is lowered by a change of pH is preferably a polymeric material having the property described above, for example, from a viewpoint of mechanical strength of the micro-lens array. Such a polymeric material can include those polymeric materials having ionic groups (ionic polymers) as described above.

It is necessary that the ionic polymer has sufficient solubility or dispersibility to an aqueous liquid (also including an aqueous liquid for controlling pH) and has light permeability.

For providing the function that solubility or dispersibility to the aqueous liquid is lowered depending on a change of pH, it is preferred that the material has hydrophilic groups and hydrophobic groups in the molecule. It is preferred that ionizable groups such as carboxyl groups (anionic groups) and amino groups (cationic groups) are introduced as the hydrophilic groups. For example, in a polymeric material having the carboxyl groups, the carboxyl groups are dissociated and dissolved in an aqueous liquid at an alkaline pH region, whereas the dissociation state is eliminated and the solubility is lowered to cause precipitation in the acidic pH region.

The presence of the hydrophobic group in the polymeric material provides the polymeric material with a function of instantaneously precipitating the film when the ionically dissociated groups lose the ionic property by a change of the pH as described above. Further, the hydrophobic groups have an ability of adsorbing fine refractive index control particles in the method of manufacturing the micro-lens array according to this invention to be described later as well as they give a dispersing function suitable for polymers. Further, the hydrophilic groups can also include hydroxy group or the like in addition to the ionic groups.

Those polymeric materials having the number of hydrophobic groups in the polymer having hydrophobic groups and hydrophilic groups is within a range from 30% to 80% based on the total number of the hydrophilic groups and hydrophobic groups are preferred. When the number of the hydrophobic groups is less than 30% based on the total of the hydrophilic groups and the hydrophobic groups, the film once formed is easily dissolved again to sometimes making the water proofness or film strength of the film insufficient. On the other hand, when the number of hydrophobic groups is more than 80% of the total number for the hydrophilic groups and the hydrophobic groups, since the solubility of the polymer to the aqueous liquid becomes insufficient, it tends to cause clouding in the electrolyte, form precipitates of the material or increase the viscosity of the electrolyte, so that the number is preferably within the range described above. The number of the hydrophobic groups based on the total number for the hydrophilic groups and the hydrophobic groups is more preferably within a range from 55% to 70%. Those polymeric materials within the range particularly have a high film precipitation efficiency and also stable for the liquid property of the electrolyte. Further, a film can be formed at a low electrodeposition potential at about a photo-voltaic force.

The polymeric material can include those formed by copolymerizing, for example, a polymeric monomer having hydrophilic group and a polymerizable monomer having a hydrophobic group.

The polymerizable monomer containing the hydrophilic group usable herein can include, for example, methacrylic acid, acrylic acid, hydroxyethyl methcarylate, acrylamide, maleic acid anhydride, fumaric acid, propionyl acid, itaconic acid and derivatives thereof with no particular limitation to them. Among all, methacrylic acid and acrylic acid are useful hydrophilic monomers since they show a high film deposition efficiency depending on pH change.

Further, the polymerizable monomer material containing hydrophobic group can include, for example, alkene, styrene, α-methylstyrene, α-ethylstyrene, methyl methacrylate, butyl methacrylate, acrylonitrile, vinyl acetate, ethyl acrylate, butyl acrylate, lauryl methacrylate and derivatives thereof, with no particular limitation to them. Particularly, styrene and α-methylstyrene are useful hydrophobic monomers since they have high hydrophilicity and tend to provide a hysteresis characteristic to re-dissolution.

As the polymeric material used in the method of manufacturing the micro-lens array according to this invention, those copolymers using acrylic acid or methacrylic acid as the hydrophilic group containing monomer and styrene or a methylstyrene as the hydrophobic group containing monomer are used preferably.

The polymeric material used in the method of manufacturing the micro-lens array according to this invention is a polymeric material formed by copolymerizing polymeric monomers containing the hydrophilic groups and hydrophobic groups, respectively, preferably, at the ratio for the number of the hydrophilic groups and the hydrophobic groups in the polymer as described above, in which the kind of each of the hydrophilic group and the hydrophobic group is not restricted to single species.

Further, the polymeric material used in this invention can be formed as a crosslinkable polymeric material by the introduction of crosslinking groups and crosslinked by heat treatment after manufacturing the micro-lens array to improve the mechanical strength or the heat resistance of the micro-lens array.

The cross-linkable group can include, epoxy group, block isocyanate group (also including those groups capable of changing into isocyanate group), cyclocarbonate group and melamine group. Accordingly, for the polymeric material, those for example, formed by copolymerizing polymerizable monomer having a crosslinkable group, a polymerizable monomer having a hydrophilic group and a monomer having a hydrophobic group can be used preferably.

The polymerizable monomer having the crosslinkable group can include, for example, glycidyl(meth)acrylate, (meth)acrylic acid azide, 2-(O-[1'-methylpropylideneamino] carboxyamino) methacrylate (trade name of products: Karenz MO1-BN, manufactured by SHOWA DENKO), 4-((meth) acryloyloxymethyl)ethylene carbonate and (meth) acryloyl melamine. The crosslinkable monomers described above are contained generally by 1 to 20 mol % in the film depositing polymeric compound although they differ depending on the kind of the monomers to be used.

The degree of polymerization of the polymeric material is from 6,000 to 25,000 for providing favorable deposition films. More preferably, the material has a polymerization degree of 9,000 to 20,000. When the polymerization degree is 6,000 or lower, it tends to be dissolved. When the polymerization degree is 25,000 or higher, solubility to the aqueous liquid is insufficient to bring about a problem such as clouding of liquid or causing precipitates.

In a case where the polymeric material has anionic groups such as carboxyl groups, a preferred film depositing property can be obtained within the acid value of the polymeric material in a range from 60 to 300. Particularly, a range from 90 to 195 is more preferred. When the acid value is 60 or less, solubility to the aqueous liquid becomes insufficient, which brings about problems that the solid concentration of the electrolyte cannot be increased to an appropriate value, the liquid is clouded or causes precipitation, or the liquid viscosity increases. Further, when the acid value exceeds 300, the film once formed tends to be dissolved again. Accordingly, the abovementioned range is appropriate.

It is preferred that the polymeric material described above shows a change of the liquid property of causing supernatants to form precipitation from the dissolved or dispersed state in which the material is dissolved within a pH region of 2 depending on a change of the pH value of the electrolyte. When the pH range is within the region of 2, the excellent effect is provided that the film can be precipitated instantaneously even for abrupt pH change, cohesion of the precipitated film is strong and the re-dissolution rate into the electrolyte is reduced. This can provide a micro-range array of a high integration degree with well-arranged shape for each of micro-lenses.

When the region of the pH range is 2 or greater, the film deposition rate to obtain a sufficient thin film structure tends to be lowered or the water proofness of the film tends to be deleted (causing reduction of resolution). For obtaining better characteristic, the region of the pH range is within 1.

Further, the electrolyte in a state where the polymeric material described above is dissolved therein preferably has a characteristic that the change of the state causing precipitation occurs abruptly to the change of the pH value, as well as a characteristic of causing less re-dissolution. This characteristic is a so-called hysteresis characteristic. For example, in a case of the anionic polymeric material, this means that precipitation occurs abruptly by the lowering of pH, but the re-dissolution does not occurs abruptly even when pH increases (for example, upon completion of electrodeposition or upon termination of light irradiation in the photo-catalytic film deposition method) and the precipitation state is maintained for a predetermined period of time.

On the other hand, in those not showing the hysteresis characteristic, the solubility increases even upon a slight pH increase and the deposition film tends to be dissolved again.

The polymeric material having the characteristics as described above can be obtained by properly controlling the kind for the hydrophilic group and the hydrophobic group, balance between the hydrophilic group and the hydrophobic group, acid value, molecular weight and the like. For the polymeric material contained in the electrolyte in this invention, the materials as described above can be combined optionally so long as the thin film-forming effect is not deteriorated, and the material can include a mixture of molecules of an identical polarity such as a mixture of two or more kinds of anionic molecules, or a mixture of molecules of different polarities such as a mixture of anionic molecules and cationic molecules.

Next, a description will be made for the conductivity of the electrolyte. The conductivity is related to the film deposition speed, that is, film deposition amount. As the conductivity is higher, the thickness of the film deposited in a predetermined period of time increases, which is saturated at about 20 mS/cm. Accordingly, in a case where the conductivity is insufficient only with the polymeric material, the film deposition speed can be controlled by adding ions giving no effects on the film deposition, for example, $NH^{4+}$ ions and $Cl^-$ ions. Usually, the conductivity of the electrolyte is increased by adding a support salt. The support salts used generally in electrochemistry can include alkali metal salts such as NaCl and KCl and tetraalkyl ammonium salt such as ammonium chloride, ammonium nitride, tetraethyl ammonium perchlorate ($Et_4NClO_4$). Such support salts can be used also in this invention.

Further, the pH of the electrolyte naturally gives effect on the formation of the thin film. For example, when film deposition is conducted under the condition that the solubility of the film precipitating molecule is saturated before forming the thin film, it is hard to be dissolved again after the formation of the thin film. On the contrary, when a film is formed at a pH of a solution of an unsaturated state, even when the film is formed, the film starts to be dissolved again at the instance the light irradiation is terminated. Accordingly, since it is desirable to form the thin film at the pH of a solution in which the solubility is saturated, it is necessary to adjust the electrolyte to a desired pH by using an acid or an alkali.

Particularly, in the photovoltaic electrodeposition method, a film can be formed at a low voltage by considering a relation between the pH of the electrolyte and the precipitation initiation point described above or by use of an electrolyte having a hysteresis characteristic.

In usual electrodeposition coating, film formation is conducted by causing irreversible reaction based on the Kolbe reaction on an electrodeposition substrate under an application voltage of 70 V or higher and setting pH for the electrolyte to a considerably higher pH value than the deposition initiation point of the electrodeposition material. However, in the film formation under the high voltage as described above, an electric field distribution on the surface of the electrode becomes uneven as a result of occurrence of bubbles, which makes the quality of the film itself inhomogeneous or causes unevenness on the surface of the film by the deforming phenomenon of bubbles, failing to form a fine pattern of good resolution and smoothness with favorable reproducibility. In this case, when the voltage is merely lowered, the film causes re-dissolution instantly upon stopping of the voltage application and fine pattern with good resolution cannot be formed.

On the contrary, use of the electrolyte having the characteristic as described above can provide an advantage that precipitation occurs easily even under the application of a low voltage which is not re-dissolved instantly even when the voltage application is stopped. The voltage application means photo-voltaic force generated in the photo-semiconductor thin film by light irradiation, or the sum thereof with a bias voltage supplementarily added thereto. The application voltage is 9 V or lower, preferably, 5 V or lower. When the film can be formed only by the photo-voltaic force, the bias voltage is not necessary (when a bias voltage higher than the voltage depending on the band gap of the semiconductor used is applied, it results in a problem that Schottky barrier between the semiconductor and the solution required for forming the photo-voltaic force is lost, so that there is a limit for an applicable bias voltage.).

The method of manufacturing the micro-lens array according to this invention utilizes the film deposition methods described above (photovoltaic electrodeposition method, photo-catalytic film deposition method). Since the thickness of the film obtained by the methods described above corresponds to the amount of light applied to the photo-semiconductor thin film, by use of this fact, a selected region of the photo-semiconductor thin film is irradiated with light controlled to a predetermined amount such that the film thickness can be formed corresponding to the cross-sectional shape of each of the micro-lenses. In the film deposition method described above, since a fine pattern can be formed at good resolution, a micro-lens array of a high integration degree can be obtained by the method of manufacturing the micro-lens array according to this invention.

Selective irradiation of light to the photo-semiconductor thin film is conducted, for example, by light irradiation or laser beam irradiation through a photo-mask. When light is applied through a photo-mask in which each of portions for transmitting light (hereinafter sometimes referred to as openings) is circular, a difference of the exposure intensity is caused in each pattern for the intensity of light applied to the photo-semiconductor thin film in which the intensity of light is lower at the portion corresponding to the circumferential edge than that at a portion corresponding to a central portion between the portion corresponding to the circumferential edge and the portion corresponding to the central portion for each of circular openings in the photo-mask. Accordingly, also for the photo-voltaic force generated in the photo-semiconductor thin film, a difference of photo-voltaic force is caused between the portion corresponding to the circumferential edge and the portion corresponding to the central portion of the circle, and a difference is caused to the thickness of the formed film correspondingly. That is, in the resultant film pattern, there is formed a film of a lens-like shape having a circular planer shape with the film thickness being reduced toward the circumferential edge of the circle in the cross-sectional shape.

By providing a gradation for the intensity of light transmitting through the circular opening that decreases from the central portion to the circumferential edge of the circular opening in the photo-mask, the cross-sectional shape or the radius of curvature of each lens can be controlled optionally. For example, it is possible to adopt a method of forming fine dots which do not transmit light at the circular opening of the photo-mask, and decreasing the density of dots from the circumferential edge to the center of the opening thereby decreasing the intensity of light passing each of the circular openings from the center to the circumferential edge. In this case, the distribution of the dot density can be adjusted such that the film thickness is formed corresponding to the curvature of the lens.

Selective irradiation of the photo-semiconductor thin film with light can also be applied by a laser beam. In this case, by irradiating while changing the intensity of laser beam irradiation so as to form a film thickness corresponding to the lens shape or curvature, it becomes possible to control so as to obtain a micro-lens array having a designed lend shape or curvature.

Further, a pattern of an aimed lens shape can be obtained by use of a laser beam having an intensity distribution that changes in accordance with a predetermined lens shape pattern, for example, Gaussian beam of a laser beam, that is, a beam of a laser beam whose light intensity is decreased from the center to the circumferential edge of the beam can be used as it is.

The material constituting the micro-lens array may include only the electrodeposition film forming the polymeric material described above. However, since the refractive index in this case is about 1.4 to 1.6, for obtaining a micro-lens array of a higher refractive index, the refractive index of the film can be controlled by dispersing fine inorganic oxide particles having light permeability and a high refractive index in addition to the film forming polymeric material in the electrolyte, and depositing them together with the polymeric material.

As the fine inorganic oxide particles, those having a refractive index of about 1.8 to 2.8 are preferably used and, for example, any of $TiO_2$, $ZnO$, $ZrO_2$ and ITO can be utilized. Fine rutile type titanium oxide particles are preferred in view of the wide control range for the refractive index and high stability. The grain size of the fine particles is preferably about 1 to 30 nm. Further, the addition amount is properly determined while considering the refractive index required for the micro-lens array and the mechanical strength of the micro-lens array.

The refractive index of the polymer can be changed by attaching substituent groups to the film depositing polymer.

In a case where the micro-lens array layer deposited and formed by the film deposition method described above has a scattering property and the light permeability is insufficient, the light permeability can be improved by heating the micro-lens array layer to higher than the glass transition point of the polymeric compound constituting the micro-lens array layer, thereby removing voids in the layer.

Further, for improving the transmittance, an anti-reflection layer is applied preferably to the surface of the lens formed by the method described above. For the material of the anti-reflection film, $SiO_2$ of a low refractive index is used preferably. Generally, the optical film thickness of a film in contact with air represented as a product of a film thickness and a refractive index is preferably at ¼ or a multiple integer thereof for the wavelength near the center of the visible region. Accordingly, in a case of obtaining transparency in a visible region (400 nm to 700 nm), when the central wavelength is 550 nm, the thickness of the anti-reflection film is preferably 96 nm or a multiple integer thereof when it is made of $SiO_2$ having a refractive index of 1.43.

In actual lens design, since the refractive index of the film-forming material (polymeric material, fine inorganic oxide particles, etc) differs depending on the material (refractive index), the transmittance and the wavelength required for the application have to be determined by strict simulation.

Figure 2:
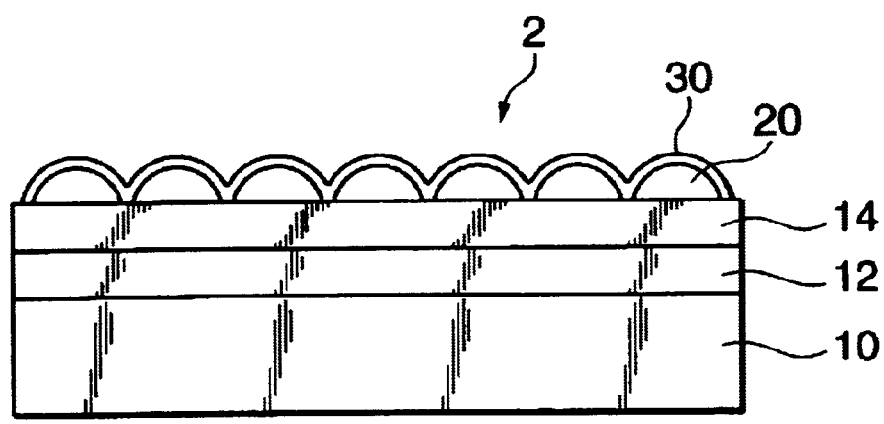
FIG. 2 is a conceptual view showing an example of a micro-lens array.

FIG. 2 illustrates an example of a micro-lens array 2 prepared by the method described above. In the drawing are shown an insulative substrate 10, a conductive thin film 12, a photo-semiconductor thin film 14, a micro-lens 20 and an antireflection film 30, respectively.

Then, an apparatus for manufacturing a micro-lens array according to this invention is to be described.

Figure 3:
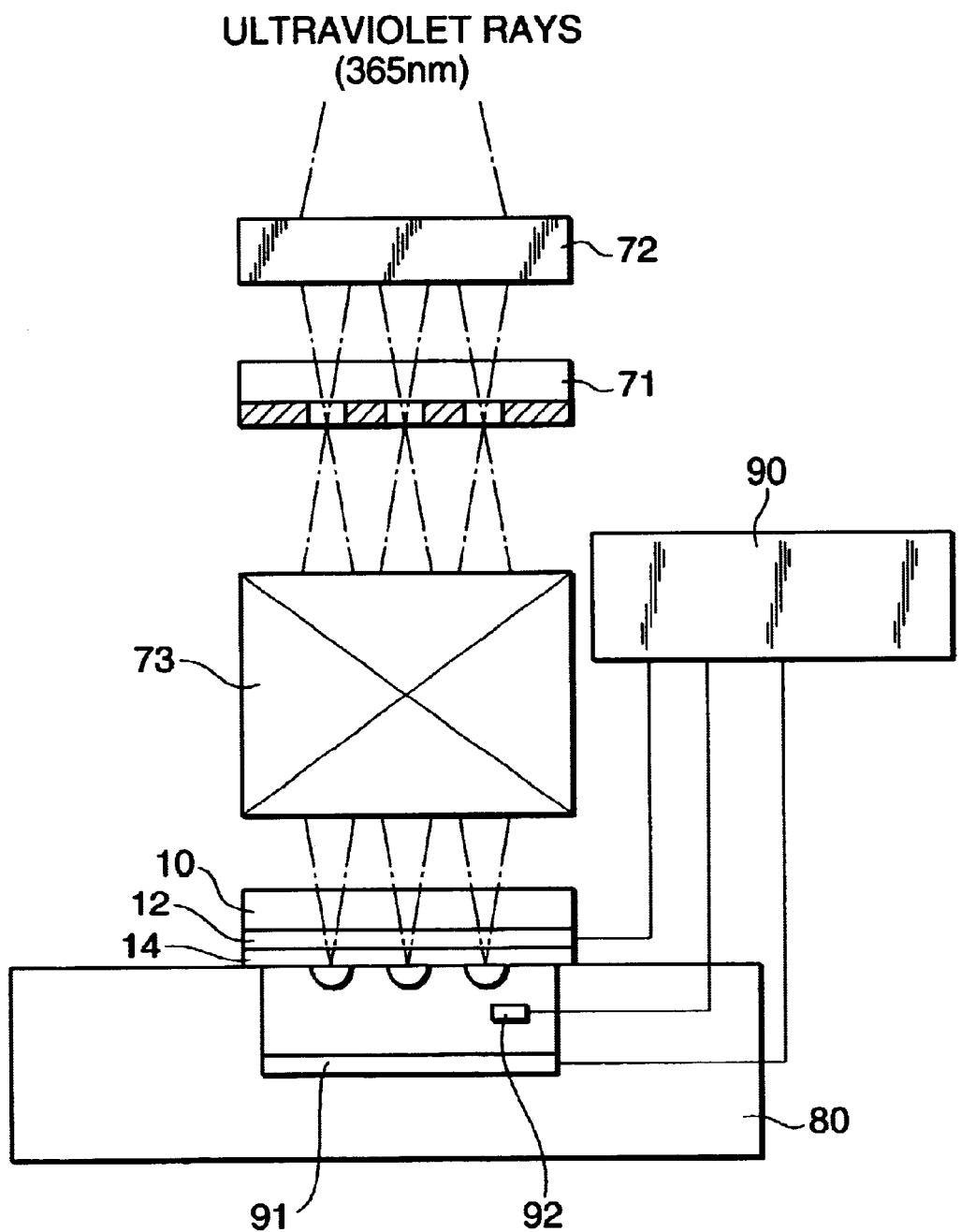
FIG. 3 is a conceptual view showing an example of an apparatus for manufacturing a micro-lens array.

FIG. 3 is a conceptual view showing an apparatus for manufacturing a micro-lens array that forms the micro-lens array by the photovoltaic electrodeposition method. The micro-lens array manufacturing apparatus shown in FIG. 3 includes a light source for applying ultra-violet rays (not illustrated), a focusing optical system having a first focusing optical lens 72 and a second focusing optical lens 73, a photo-mask 71 interposed between the first focusing optical lens and the second focusing optical lens, an electrodeposition vessel 80 containing an electrolyte, a unit 90 which conducts voltage application such as a potentiostat, a counter electrode 91 and a reference electrode 92 such as a saturated calomel electrode. Further, a mirror reflection optical system may also be used instead of the focusing optical system in the micro-lens array manufacturing apparatus. Then, as shown in FIG. 3, a micro-lens array preparing substrate is used in the apparatus while being disposed to the electrodeposition vessel. Pattern exposure light can be focused to a photo-semiconductor thin film by use of the projection optical system as described above and a fine micro-lens array can be formed in a short exposure time. In a case where necessary electrodeposition voltage is obtained only by the photo-voltaic force, it will be apparent that the unit for voltage application may be omitted.

The distance between the second focusing optical lens in the focusing optical system and the surface of the light permeable substrate is preferably set to 1 mm to 50 cm in view of handlability, and the focal depth of the second focusing optical lens is preferably within a range from ±10 to ±100 μm in view of the accuracy and the handlability.

Figure 4:
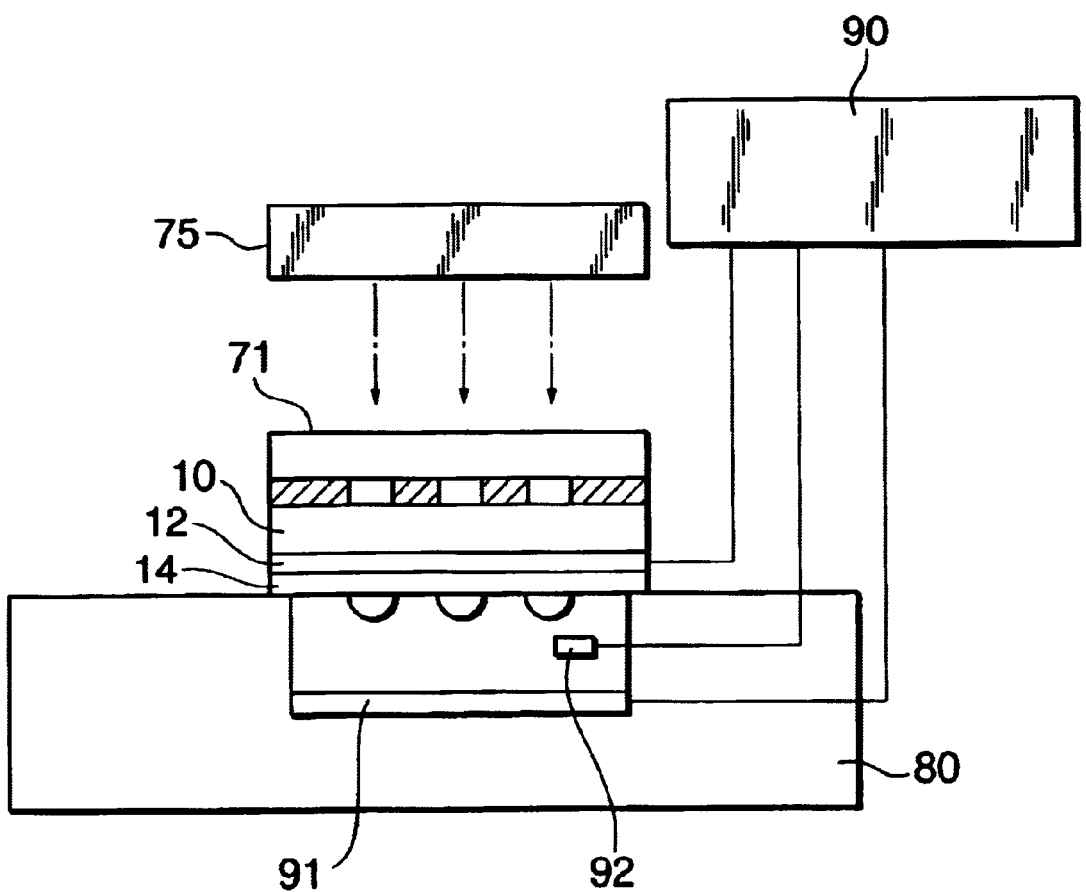
FIG. 4 is a conceptual view showing another example of an apparatus for manufacturing a micro-lens array.

Further, in a case where the photo-mask and the photo-semiconductor thin film are close to each other, it is not necessary to use the apparatus equipped with the exposure device having the focusing optical system or the mirror reflection optical system described above but light irradiation can be conducted by a parallel light or close contact type exposure device. For the irradiation light source, an Hg—Xe uniform irradiation light source can be used for example. For example, a micro-lens array of a high integration degree can be formed as shown in FIG. 4 by use of an Hg—Xe uniform irradiation optical source 75, bringing the photo-mask 71 into intimate contact with the insulative substrate 10 as a micro-lens array preparing substrate, or further reducing the insulative substrate to 0.2 mm or less to prevent diffraction of light.

Light irradiation can of course be applied by an expensive scanning type laser writing apparatus if a longer exposure time is allowed. Although not illustrated, a scanning type laser writing apparatus for laser beam irradiation such as an He—Cd laser may also be used instead of the exposure device in FIG. 3 or FIG. 4. When a Gaussian beam in which the light intensity is higher toward the beam center and lower toward the periphery is used as the laser light beam and predetermined positions are irradiated with a laser beam while turning on and off the laser beam, micro-lenses are formed as an array with the radius of curvature or the like being determined in accordance with the beam diameter.

In addition, a proximity type exposure device may also be used within a range for the permissible pattern resolution.

For the exposure in the micro-lens array manufacturing apparatus described above, exposure from the insulative substrate as the micro-lens array preparing substrate has been described, but exposure may be applied also on the side of the photo-semiconductor thin film. In the case of exposure on the side of the photo-semiconductor thin film, the substrate is dipped in the electrolyte. Since the electrolyte used in this invention does not absorb UV-rays used as the irradiation light, exposure can be applied through the electrolyte to the photo-semiconductor thin film. However, as the film thickness increases, since absorption of light becomes noticeable to make it difficult to prepare a lens shape, it is desirable to apply exposure on the side of the insulative substrate.

Further, in the photovoltaic electrodeposition method, when a sufficient photo-voltaic force to electrodeposition is obtained by the photo-semiconductor, it is not necessary to apply a bias voltage by the voltage application device.

In FIG. 3 and FIG. 4, while the voltage application device 90 is connected with the conductive thin film, the photo-semiconductor thin film functions as a working electrode.

As an apparatus for manufacturing a micro-lens array by photo-catalytic film deposition method, a constitution may be used in which the device 90 for voltage application, the counter electrode 91 and the reference electrode 92 are removed from the apparatus shown in FIG. 3 and FIG. 4. When a micro-lens array is manufactured by use of the apparatus, it is necessary that the conductive thin film of the micro-lens array preparing substrate is in electrical conduction with the electrolyte.

Preferred embodiments of this invention are set forth below.

A method of manufacturing a micro-lens array, in which the selected region of the photo-semiconductor thin film is irradiated with light through a photo-mask.

A method of manufacturing a micro-lens array, in which the photo-mask has a gradation for light transmittance in a light-permeable portion.

A method of manufacturing a micro-lens array, in which the selected region of the photo-semiconductor thin film is irradiated with a laser beam.

A method of manufacturing a micro-lens array, in which the laser beam has an intensity distribution that changes in accordance with a predetermined lens shape pattern.

A method of manufacturing a micro-lens array, in which the laser beam is a Gaussian beam.

A method of manufacturing a micro-lens array, in which the photo-semiconductor thin film is a titanium oxide thin film.

A method of manufacturing a micro-lens array, in which the thin titanium oxide film contains an anatase type crystal structure.

A method of manufacturing a micro-lens array, in which fine inorganic oxide particles having light permeability and a high refractive index are dispersed in the electrolyte.

A method of manufacturing a micro-lens array, in which the fine inorganic oxide particles are rutile type fine titanium oxide particles.

A method of manufacturing a micro-lens array, in which the film-forming material is a polymeric material having carboxyl groups.

A method of manufacturing a micro-lens array, which further contains a step of applying heat treatment to the precipitated and formed micro-lens array layer and a step of disposing an anti-reflection film on the micro-lens array or both of the steps.

An electrolyte for use in the method of manufacturing a micro-lens array, in which an electrolyte contains a film-forming material of which solubility or dispersibility to an aqueous liquid is lowered by a change of pH, and in which the film-forming material is a polymeric material having hydrophobic groups and hydrophilic groups with a number of the hydrophobic groups being within a range from 30 to 80% for a total number of the hydrophilic group and hydrophobic groups.

An electrolyte, further containing fine inorganic oxide particles having a light permeability and a high refractive index.

An apparatus for manufacturing a micro-lens array including an exposure device having at least a light source for applying light and a focusing optical system having a first focusing optical lens and a second focusing optical lens, a photo-mask interposed between the first focusing optical lens and the second focusing optical lens, a counter electrode, a unit capable of applying a bias voltage and an electrodeposition vessel containing an electrolyte, in which a micro-lens array preparing substrate is disposed in the electrodeposition vessel such that at least a photo-semiconductor thin film thereof is in contact with the electrolyte.

An apparatus for manufacturing a micro-lens array including an exposure device having at least a light source for applying light and a mirror reflection optical system, a counter electrode, a unit capable of applying a bias voltage and an electrodeposition vessel containing an electrolyte, in which a micro-lens array preparing substrate is disposed in the electrodeposition vessel such that at least a photo-semiconductor thin film thereof is in contact with the electrolyte.

An apparatus for manufacturing a micro-lens array including a parallel irradiation type or close contact type exposure device, a counter electrode, a unit capable of applying a bias voltage and an electrodeposition vessel containing an electrolyte, in which a micro-lens array preparing substrate is disposed in the electrodeposition vessel such that at least a photo-semiconductor thin film thereof is in contact with the electrolyte.

An apparatus used for manufacturing a micro-lens array including a laser beam exposure device, a counter electrode, a unit capable of applying a bias voltage and an electrodeposition vessel containing an electrolyte, in which a micro-lens array preparing substrate is disposed in the electrodeposition vessel such that at least a photo-semiconductor thin film thereof is in contact with the electrolyte.

An optical part including a conductive thin film disposed on an insulative substrate, a photo-semiconductor thin film disposed in contact with the conductive thin film and a lens formed on the photo-semiconductor thin film.

An optical part, in which a number of the lenses are plurally disposed.

EXAMPLE

This invention will be explained more specifically showing examples but the invention is not limited to such examples.

Example 1

75 nm of an ITO film and 110 nm of an anatase type thin titanium oxide film were formed by an RF sputtering method on an alkali-free glass substrate (7059 glass) of 0.4 mm in thickness to prepare a micro-lens array preparing substrate.

Then, an electrolyte including an aqueous liquid dispersion containing transparent fine particles (solid content: 10 mass %) was prepared by dispersing rutile type fine titanium oxide particles (grain size: 10 nm, refractive index: 2.7), styrene-acrylic acid copolymer (molecular weight: 13,000, molar ratio for hydrophobic group/(hydrophilic group+ hydrophobic group): 0.65, acid value: 150) at a 1:5 volumic ratio, adding 5 mass % of ethylene glycol and further, using tetramethyl ammonium hydroxide and ammonium chloride to control pH to 7.8 and conductivity to 6 mS/cm.

A three-electrode type customary electrodeposition apparatus in electrochemistry shown in FIG. 3 was used and a $TiO_2$ thin film as a micro-lens array preparing substrate was utilized as a working electrode to a saturated calomel electrode.

A projection type exposure device manufactured by USHIO INC. was used as an exposure device (light intensity: 100 mW/cm$^2$, wavelength: 365 nm). Further, it was adjusted such that light from a first focusing lens was once focused on a photo-mask and further focused through a second focusing lens to the surface of a thin titanium oxide film on the rear face of the substrate. The distance from the second focusing lens to the focusing surface was set to 10 cm and the focal depth was set to ±50 µm.

In the photo-mask, fine black dots were formed to a light-permeable portion corresponding to one lens with the density being increased from the central portion to the peripheral edge such that a predetermined micro-lens array could be formed to provide a density graduation (graduation for light transmittance).

Ultra-violet rays were exposed for 30 seconds from the rear side of the substrate while applying 1.8 V of a bias voltage by use of a potentiostat between a counter electrode and a working electrode.

A transparent resin lens pattern containing fine titanium oxide particles was formed on the surface of the $TiO_2$ thin film in a light-irradiated region.

Since the light was scattered and the transparency was insufficient in this state, heat treatment was applied at 150° C. to provide a micro-lens array having optical transparency.

Further, $SiO_2$ was precipitated to 96 nm that functioned as an anti-reflection film by sputtering on the micro-lens array to form a micro-lens array of high transmittance.

The resultant micro-lens array had a refractive index of 1.65, a lens diameter of 30 µm and a radius of curvature of 20 µm. Further, the integration degree of the lens was: $1.28 \times 10^5$ lenses/cm$^2$.

Example 2

Electrodeposition was conducted by use of the same micro-lens array preparing substrate, photo-mask, electrolyte and electrodeposition conditions as those in Example 1 except for using a micro-lens array manufacturing apparatus shown in FIG. 4. A mercury xenon lamp (manufactured by Yamashita Denso Corporation, light intensity: 50 mW/cm$^2$, wavelength: 365 nm) was used as the exposure device and the photo-mask was made in intimate contact with the glass substrate of the micro-lens array preparing substrate.

Further, heat treatment was applied at 150° C. in the same manner as in Example 1 and a 96-nm $SiO_2$ film was formed to obtain a micro-lens array.

The same micro-lens array as in Example 1 was obtained.

Example 3

Electrodeposition was conducted by use of the same micro-lens array preparing substrate, photo-mask, electrolyte and electrodeposition conditions as those in Example 1 except for using a laser beam exposure device instead of using the projection type exposure device used in Example 1. A laser beam exposure device using an He—Cd laser, operationally associated with a Galvano scanner and an AO modulator and capable of turning on and off the laser beam at a predetermined position was used. The laser beam was formed as a Gaussian beam in which the intensity of light was increased toward the beam center and decreased toward the periphery. Exposure was conducted while scanning by the exposure apparatus.

Further, heat treatment was applied at 150° C. in the same manner as in Example 1 and a 96-nm $SiO_2$ film was formed to obtain a micro-lens array.

The same micro-lens array as in Example 1 was obtained.

The method of manufacturing the micro-lens array according to this invention can manufacture a micro-lens array by a simple and convenient method at a reduced cost, manufacture a micro-lens array of a high integration degree and optionally control the integration degree and the refractive index. Further, a micro-lens array of optional pattern including those of complicate shapes can be manufactured. Furthermore, the light condensing efficiency of the resultant micro-lens array is high. In addition, since this is a simple method, mass production is possible. In the existent method of manufacturing the micro-lens array by use of a photo-sensitive resin, the film has to be coated to the substrate under accurate control for the film thickness and also involves a problem such as discharge of alkaline liquid wastes by etching. However, according to this invention, a lens of a uniform shape can be manufactured easily and no etching treatment for pattern formation is necessary to cause a smaller burden on the environment.

The entire disclosure of Japanese Patent Application No. 2002-018746 filed on Jan. 28, 2002 including specification, claims, drawings and abstract is incorporated herein by reference in its entirety.

What is claimed is:

1. A method of manufacturing a micro-lens array comprising the steps of:
    disposing a substrate having a conductive thin film and a photo-semiconductor thin film in this order on an insulative base in an aqueous electrolyte containing a film-forming material of which solubility or dispersibility to an aqueous liquid is lowered by a change of pH, with the photo-semiconductor thin film being in contact with an electrolyte;
    irradiating with light a selected region of the photo-semiconductor thin film to apply a voltage between the photo-semiconductor thin film in the selected region and a counter electrode; and
    precipitating the material to the selected region of the photo-semiconductor thin film to form a micro-lens array layer.

2. A method of manufacturing a micro-lens array comprising the steps of:
    disposing a substrate in which a conductive thin film and a photo-semiconductor thin film in contact with the conductive thin film are formed on an insulative base and the conductive thin film is in electrical conduction with an electrolyte to an aqueous electrolyte containing a film-forming material of which solubility or dispersibility to an aqueous liquid is lowered by a change of pH, with the photo-semiconductor thin film being in contact with the electrolyte;
    irradiating with light a selected region of the photo-semiconductor thin film in a state where the photo-conductive thin film is in electrical conduction with the electrolyte; and
    precipitating the material to the selected region of the photo-semiconductor thin film to form a micro-lens array layer.

3. The method of manufacturing a micro-lens array according to claim 1,
    wherein the selected region of the photo-semiconductor thin film is irradiated with light through a photo-mask.

4. The method of manufacturing a micro-lens array according to claim 3,
    wherein the photo-mask has a gradation for light transmittance in a light-permeable portion.

5. The method of manufacturing a micro-lens array according to claim 1,
    wherein the selected region of the photo-semiconductor thin film is irradiated with a laser beam.

6. The method of manufacturing a micro-lens array according to claim 5,
    wherein the laser beam has an intensity distribution that changes in accordance with a predetermined lens shape pattern.

7. The method of manufacturing a micro-lens array according to claim 5,
    wherein the laser beam is a Gaussian beam.

8. The method of manufacturing a micro-lens array according to claim 1,
    wherein the photo-semiconductor thin film is a titanium oxide thin film.

9. The method of manufacturing a micro-lens array according to claim 8,
    wherein the thin titanium oxide film contains an anatase type crystal structure.

10. The method of manufacturing a micro-lens array according to claim 1,
    wherein fine inorganic oxide particles having light permeability and a high refractive index are dispersed in the electrolyte.

11. The method of manufacturing a micro-lens array according to claim 10,
    wherein the fine inorganic oxide particles are rutile type fine titanium oxide particles.

12. The method of manufacturing a micro-lens array according to claim 1,
    wherein the film-forming material is a polymeric material having carboxyl groups.

13. The method of manufacturing a micro-lens array according to claim 1, further comprising the steps of:
    applying heat treatment to the precipitated and formed micro-lens array layer;
    disposing an anti-reflection film on the micro-lens array; and
    carrying out both of the above steps as necessary.

14. An electrolyte for use in the method of manufacturing a micro-lens array according to claim 1, the electrolyte comprising:
    a film-forming material of which solubility or dispersibility to an aqueous liquid is lowered by a change of pH,
    wherein the film-forming material is a polymeric material having hydrophobic groups and hydrophilic groups with a number of the hydrophobic groups being within a range from 30 to 80% for a total number of the hydrophilic group and hydrophobic groups.

15. The electrolyte according to claim 14, further comprising fine inorganic oxide particles having light permeability and a high refractive index.

16. An apparatus for manufacturing a micro-lens array, comprising:

an exposure device having at least a light source for applying light and a focusing optical system having a first focusing optical lens and a second focusing optical lens;

a photo-mask interposed between the first focusing optical lens and the second focusing optical lens;

a counter electrode;

a unit capable of applying a bias voltage; and an electrodeposition vessel containing an electrolyte, wherein a micro-lens array preparing substrate is disposed in the electrodeposition vessel such that at least a photo-semiconductor thin film thereof is in contact with the electrolyte.

17. An apparatus for manufacturing a micro-lens array, comprising:

an exposure device having at least a light source for applying light and a mirror reflection optical system;

a counter electrode;

a unit capable of applying a bias voltage; and an electrodeposition vessel containing an electrolyte, wherein a micro-lens array preparing substrate is disposed in the electrodeposition vessel such that at least a photo-semiconductor thin film thereof is in contact with the electrolyte.

18. An apparatus for manufacturing a micro-lens array, comprising:

a parallel irradiation type or close contact type exposure device;

a counter electrode;

a unit capable of applying a bias voltage; and an electrodeposition vessel containing an electrolyte, wherein a micro-lens array preparing substrate is disposed in the electrodeposition vessel such that at least a photo-semiconductor thin film thereof is in contact with the electrolyte.

19. An apparatus for manufacturing a micro-lens array, comprising:

a laser beam exposure device;

a counter electrode;

a unit capable of applying a bias voltage; and an electrodeposition vessel containing an electrolyte, wherein a micro-lens array preparing substrate is disposed in the electrodeposition vessel such that at least a photo-semiconductor thin film thereof is in contact with the electrolyte.

20. An optical part comprising:

a conductive thin film disposed on an insulative base;

a photo-semiconductor thin film disposed in contact with the conductive thin film; and a lens formed on the photo-semiconductor thin film.

21. An optical part according to claim 20, wherein a number of the lenses are plurally disposed.

* * * * *